Oct. 9, 1951 K. J. MANION 2,570,577
VIBRATION ABSORBER
Filed June 13, 1947

Inventor
Kenneth J. Manion
By
E. V. Hardway.
Attorney

Patented Oct. 9, 1951

2,570,577

UNITED STATES PATENT OFFICE 2,570,577

VIBRATION ABSORBER

Kenneth J. Manion, Houston, Tex.

Application June 13, 1947, Serial No. 754,365

6 Claims. (Cl. 255—28)

This invention relates to a vibration absorber.

An object of the invention is to provide a vibration absorber of the character described specially designed for use in drills, more particularly of the type designed for use in drilling deep wells.

In the drilling of wells, particularly deep wells, hard strata, such as rock, are often encountered and in drilling through a hard stratum by the rotary process vibration is imparted to the drill. It is common practice to attach a drill to the lower end of a tubular drill stem and the drill is rotated by rotating the drill stem from the ground surface. The vibration of the drill, above referred to, unless absorbed, will be imparted to the drill stem thus deteriorating the metal of the stem and often causing crystallization of said metal and breakage of the stem.

It is the main object of the present invention to incorporate into the stem, preferably at the lower end thereof, a vibration absorber, which will absorb all, or a major portion of, the vibration imparted to the drill.

It is another object of the present invention to provide, in a drilling appliance, a vibration absorber which is of simple construction, may be cheaply and easily assembled and which will be of sufficient strength to withstand the stresses to which the drill stem may be subjected.

Other objects and advantages will be apparent from the following specification which is illustrated in the accompanying drawings, wherein.

Referring now more particularly to the drawings wherein like numerals of reference designate the same parts in each of the figures, the numerals 1 and 2 designate outer and inner tubular pipe sections preferably of the same length and spaced apart and preferably, though not necessarily, cylindrical in shape.

Fitted between the upper and lower ends of these sections are substantially similar tubular coupling members 3 and 4 whose outer ends terminate in externally threaded pins 5 and 6, respectively.

Figure 1:
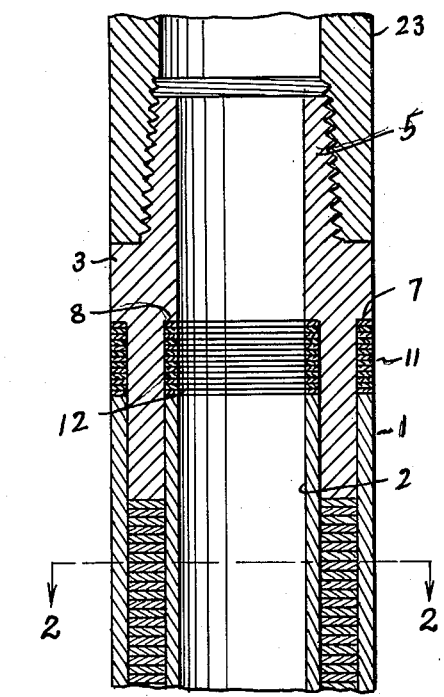
Figure 1 is a vertical, sectional view of the vibration absorber connected into the drill stem and to the drill.
Figure 2:
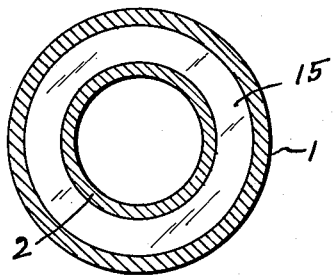
Figure 2 is a cross-sectional view taken on the line 2—2 of Figure 1.

As illustrated in Figure 1, the coupling members may be welded to the outer and inner pipe sections 1 and 2 although they may be secured thereto in any preferred manner.

As illustrated in Figure 1, the coupling member 3 has the external and internal annular shoulders 7 and 8 and the coupling member 4 has the similar external and internal annular shoulders 9 and 10. These shoulders 7 and 8 are spaced from the corresponding ends of pipe sections 1, 2 and the shoulders 9, 10 are spaced from the corresponding ends of said pipe sections.

There are the outer and inner series of annular plates 11, 12 clamped between the shoulders 7, 8 and the corresponding ends of the pipe sections 1, 2 and there are the outer and inner series of annular plates 13, 14 clamped between the shoulders 9, 10 and the corresponding ends of the pipe sections 1, 2.

Also there is a series of annular plates 15 assembled between the pipe sections 1 and 2 and against which series the inner ends of the coupling members 3, 4 abut.

In assembling the absorber, as shown in Figure 1, it is subjected to an endwise compressive force so as to place the series of annular plates, above referred to, under high compression while the parts are being permanently secured together.

Figure 4:
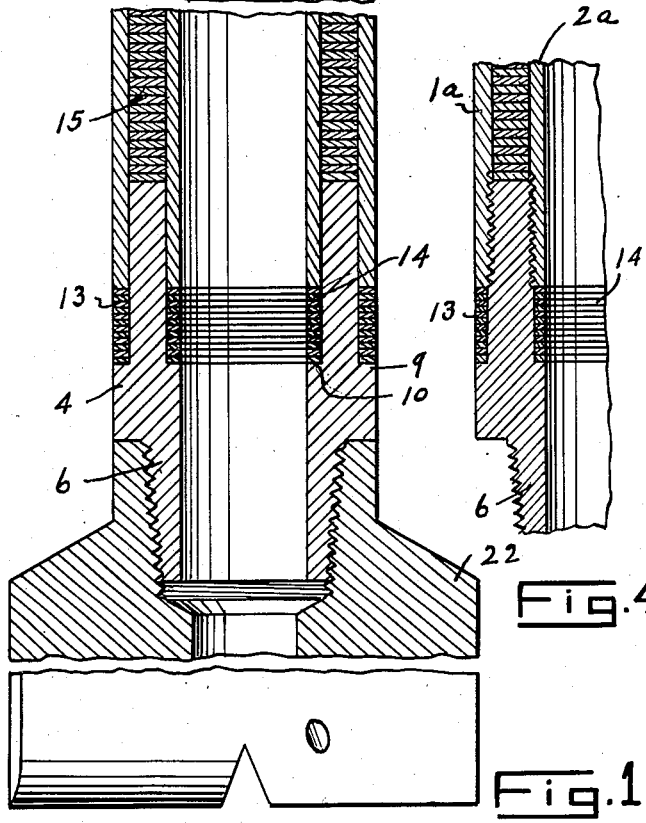
Figure 4 is a fragmentary, vertical, sectional view illustrating another method of assembling the absorber.

If desired the coupling members referred to may be screwed into the corresponding ends of the outer and inner pipe 1a, 2a as shown in Figure 4 and by this method the endwise-compressive force above referred to may be applied to said series of annular plates 11, 13 and 15 and the parts maintained in assembled relation.

Figure 3:
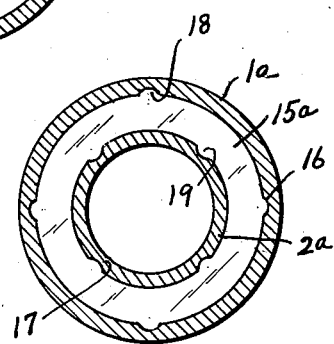
Figure 3 is a cross-sectional view showing a slight modification.

As illustrated in Figure 3 the outer pipe section may be provided with internal longitudinal grooves, as 16, and the inner pipe section 2a may be formed with external longitudinal grooves 17. In such case the plates of the assembly 15a will be provided with external detents 18 to fit into the grooves 16 in assembly and may be provided with the internal detents 19 to fit into the grooves 17 to hold the plates 15a against turning.

In assembling the parts the surfaces of the annular plates may be covered with a film of grease, oil or other suitable liquid and a certain amount of air will be entrapped between said plates. This will impart to the series of annular plates additional vibration absorbing qualities.

The pin 6 may then be screwed into the shank of the drill 22 and the pin 5 may be screwed into the lower end of the drill stem 23.

The invention as illustrated in Figure 1 also constitutes an efficient type of drill collar, or hub, in addition to its vibration absorbing qualities.

The operation of the device in absorbing vibrations is believed to be due to the dampening effect of the plates with the air or other absorbing medium therebetween which present a mass having the ability to absorb the compressive energy of vibrations caused by longitudinal thrusts.

A preferred form of the invention has been illustrated and described although mechanical variations may be incorporated therein without departing from the principle of the invention as defined by the appended claims.

What I claim is:

1. A vibration absorber for drilling tools comprising, tubes spaced radially apart and adapted to be connected into a drill-driving stem, couplings each connected to the respective adjacent ends of the tubes, each of said couplings having inner and outer annular shoulders spaced outwardly beyond and in opposed relation to the adjacent ends of the respective tubes, outer and inner series of superimposed annular plates, clamped together under compression between said shoulders and said adjacent ends of the tubes assembly for compressing said plates together.

2. A vibration absorber for drilling tools comprising, tubes spaced radially apart and adapted to be connected into a drill-driving stem, couplings each connected to the respective adjacent ends of the tubes, said couplings having external and internal annular shoulders in opposed axially spaced relation to the respective adjacent ends of the tubes outer and inner series of superimposed annular plates, clamped together under compression between said shoulders and said adjacent ends of the tubes and a series of superimposed annular plates between the tubes and couplings and clamped together under compression by the couplings.

3. A vibration absorber for drilling tools comprising, substantially concentric tubes spaced radially apart, couplings each connecting the respective adjacent ends of the tubes and forming means for connecting the assembly to a drill and to a driving stem, a series of superimposed annular plates between the tubes and couplings and clamped together under compression by said couplings.

4. A vibration absorber for drilling tools comprising, tubes spaced radially apart and adapted to be connected into a drill-driving stem, couplings each connected to the respective adjacent ends of the tubes, each of said couplings having external and internal annular shoulders in opposed axially spaced relation to the respective adjacent ends of the tubes outer and inner series of superimposed annular plates clamped together under compression between said shoulders and said respective adjacent ends of the tubes, and a series of superimposed annular plates between the tubes and couplings and clamped together under compression by the couplings and whose contact faces are covered with a liquid film.

5. A vibration absorber for drilling tools comprising, tubes spaced radially apart and adapted to be connected into a drill-driving stem, couplings each connected to the respective adjacent ends of the tubes, said couplings having portions axially spaced from and opposed to said respective adjacent ends of the tubes, outer and inner series of superimposed annular plates whose contact faces are covered with a grease film, said plates being clamped together under compression between said portions of the couplings and said respective adjacent ends of the tubes and a series of superimposed annular plates between the tubes and couplings and compressed together by the couplings under compression and whose contact faces are covered with a grease film.

6. A vibration absorber for drilling tools comprising, substantially concentric tubes spaced radially apart, couplings each connecting the respective adjacent ends of the tubes and forming means connecting the assembly to a drill and to a driving stem, a series of superimposed annular plates between the tubes and couplings and compressed together by said couplings under compression and whose contact faces are covered with a grease film.

KENNETH J. MANION.

REFERENCES CITED

The following references are of record in the file of this patent:

UNITED STATES PATENTS

| Number | Name | Date |
| --- | --- | --- |
| 1,085,443 | Lanchester | Jan. 27, 1914 |
| 1,208,441 | Alexanderson | Dec. 12, 1916 |
| 1,731,171 | Miller | Oct. 8, 1929 |
| 2,025,100 | Gill et al. | Dec. 24, 1935 |
| 2,126,075 | Wright | Aug. 9, 1938 |
| 2,212,153 | Eaton et al. | Aug. 20, 1940 |